United States Patent
Al-Mufti et al.

(10) Patent No.: US 8,805,410 B2
(45) Date of Patent: Aug. 12, 2014

(54) ENHANCING A-GPS LOCATION ACCURACY AND YIELD WITH LOCATION MEASUREMENT UNITS AND NETWORK TIMING MEASUREMENTS

(71) Applicant: Maple Acquisition LLC, Annapolis, MD (US)

(72) Inventors: Khalid Al-Mufti, Sterling, VA (US); Suryanarayana Kalenahalli, Chantilly, VA (US)

(73) Assignee: Maple Acquisition LLC, Annapolis, MD (US)

( * ) Notice: Subject to any disclaimer, the term of this patent is extended or adjusted under 35 U.S.C. 154(b) by 41 days.

(21) Appl. No.: 13/678,888

(22) Filed: Nov. 16, 2012

(65) Prior Publication Data

US 2013/0122929 A1    May 16, 2013

Related U.S. Application Data

(60) Provisional application No. 61/560,392, filed on Nov. 16, 2011, provisional application No. 61/565,757, filed on Dec. 1, 2011.

(51) Int. Cl.

| | |
|---|---|
| *H04W 24/00* | (2009.01) |
| *H04W 64/00* | (2009.01) |
| *G01S 19/06* | (2010.01) |
| *G01S 19/09* | (2010.01) |

(52) U.S. Cl.
CPC ............ *H04W 64/00* (2013.01); *H04W 64/003* (2013.01); *H04W 64/006* (2013.01); *G01S 19/06* (2013.01); *G01S 19/09* (2013.01)
USPC ................... 455/456.1; 455/456.2; 455/456.3; 455/456.4; 455/456.5; 455/456.6

(58) Field of Classification Search
CPC . H04W 64/00; H04W 64/003; H04W 64/006; G01S 19/06; G01S 19/09
USPC .......... 455/456.1, 456.2, 456.3, 456.4, 456.5, 455/456.6
See application file for complete search history.

(56) References Cited

U.S. PATENT DOCUMENTS

| | | | |
|---|---|---|---|
| 6,603,978 B1 * | 8/2003 | Carlsson et al. ............. 455/502 |
| 2004/0087317 A1 * | 5/2004 | Caci ........................... 455/456.1 |
| 2005/0070223 A1 * | 3/2005 | Camp et al. .................. 455/13.2 |
| 2008/0316091 A1 * | 12/2008 | Wigren et al. ........... 342/357.02 |
| 2012/0129551 A1 * | 5/2012 | Islam ........................ 455/456.1 |
| 2013/0023285 A1 * | 1/2013 | Markhovsky et al. ...... 455/456.1 |
| 2013/0143497 A1 * | 6/2013 | Das et al. ..................... 455/41.2 |

\* cited by examiner

*Primary Examiner* — Khai M Nguyen
(74) *Attorney, Agent, or Firm* — Tarolli, Sundheim, Covell & Tummino LLP (57) ABSTRACT

A system and method for determining the location of a mobile device. One or more location measurement units (LMUs) or components may be requested to provide timing relationship information from a respective cell site. These LMUs may then be tasked to measure uplink times of arrival of signals received by the LMUs from a target mobile device. A response message from the target mobile device may be received, the response message having reference epoch frame information whereby a Global Positioning System (GPS) time estimate at the reference epoch that the target mobile device used to make GPS satellite measurements is determined as a function of the requested timing relationship information. Satellite information may then be determined using the determined GPS time estimate, and a location of the mobile device performed using this satellite information.

21 Claims, 7 Drawing Sheets

ENHANCING A-GPS LOCATION ACCURACY AND YIELD WITH LOCATION MEASUREMENT UNITS AND NETWORK TIMING MEASUREMENTS

CROSS REFERENCES

The present application is with and claims the priority benefit of the provisional application entitled, "Enhancing the A-GPS Location Accuracy and Yield With Location Measurement Units and Network Timing Measurements," Application Ser. No. 61/560,392, filed on Nov. 16, 2011 the entirety of which is incorporated herein by reference. The present application is with and claims the priority benefit of the provisional application entitled, "Enhancing the A-GPS Location Accuracy and Yield With Location Measurement Units and Network Timing Measurements," Application Ser. No. 61/565,757, filed on Dec. 1, 2011, the entirety of which is incorporated herein by reference.

BACKGROUND

Assisted-Global Positioning System (A-GPS) technology has emerged as a better alternative than conventional Global Positioning System (GPS) technology for providing accurate location determination for mobile terminals operating in wireless telecommunication networks. In an exemplary A-GPS system, a telecommunication network may transmit assistance data to a mobile device or terminal to reduce the search time for acquiring satellite signals. Advantages of A-GPS over conventional GPS include, among others, a reduced time-to-first-fix (TTFF), reduced battery consumption at the mobile device, and an increased GPS receiver sensitivity, thereby making it possible for the receiver to detect weaker satellite signals. There are two types of operation in the A-GPS scheme, mobile device based (MS-based) and MS-assisted modes. In the MS-based mode, a position determination entity (PDE) is situated inside the mobile device. In the MS-assisted mode, the mobile device measures satellite pseudo-ranges and passes these pseudo-ranges to a remote entity where the PDE resides. This remote entity may be a Serving Mobile Location Center (SMLC) for a Global System for Mobile Communications (GSM) network, a Radio Network Controller (RNC) or Stand Alone SMLC (SAS) for a Universal Mobile Telecommunications System (UMTS) network, and the like.

Conventionally, measurements from a minimum of five satellites are needed to perform a location determination in an A-GPS system as there are five unknowns in the problem including the three dimensional location of the mobile device to be located, user equipment (UE) clock bias, and GPS time bias. The minimum number of satellites to perform the location determination may be reduced to four if the elevation of the mobile terminal can be estimated based on apriori knowledge of the elevation of the cell serving the mobile terminal to thus introduce the earth's surface as an additional hyperboloid. Indoor environments and urban canyons, however, may prevent such an estimation where the mobile device may be unable to view four satellites. Therefore, there is a need in the art to reduce this requirement so that a location calculation may be performed with measurements from three satellites. There is also a need in the art to increase GPS receiver sensitivity when satellite visibility is limited.

The concept of using location measurement units (LMUs) for providing time information assistance to a GPS receiver has been discussed in U.S. Pat. No. 6,603,978 to Carlson, the entirety of which is incorporated herein by reference. Methods such as this may suffer from inaccurate estimates of the GPS-to-GSM time, or GPS-to-System time, and other timing relationships at the mobile device or terminal since propagation delay from the mobile terminal to the base-station/LMU may be ignored completely or approximated. Another technique, Multiple Range Estimation Location (MREL) described in U.S. patent application Ser. No. 12/292,821 and continuations thereof, the entirety of each being incorporated herein by reference, employs a method to accurately determine propagation delay. Other methods have depended upon a group of A-GPS capable mobile devices or terminals to build a database of GPS-to-System time relationships. US2008/0316091 to Wigren proposed such a database which may be used for fine-time assisted GPS techniques, however, such an approach adds overhead to the corresponding communications network to exchange assistance and response information to mobile devices. A further disadvantage for such a technique is for mobile devices in areas having low satellite visibility (e.g., urban canyons and indoor locations) it may not be possible to receive GPS signals thus making it difficult to construct the proposed GPS-System time database.

SUMMARY

Embodiments of the present subject matter may determine the GPS-System time relationship by an LMU and transmit such information to a node (e.g., SMLC/SAS) while the mobile device measures the GPS signals thereby eliminating the need to solve for the GPS-Time variable from the location solution. Embodiments of the present subject matter may provide fine-time assistance information with an enhanced GPS-time accuracy and/or impose bounds of a GPS location solution by employing highly accurate initial estimates of the mobile device's respective location. This high accuracy initial estimate of the mobile device's location may be determined by uplink, range, or other measurements from a plurality of LMUs or from the relative downlink timing, as measured by the mobile device, from the serving and neighboring cells of the mobile, e.g., Observed Time Difference of Arrival (OTDOA). Embodiments of the present subject matter may incorporate such techniques to develop a methodology to enhance A-GPS location accuracy and yield and also ensure an acceptable TTFF.

One embodiment may estimate GPS-time and initial location at substantially the same time a mobile device makes pseudo-range measurements in the respective A-GPS problem and its application thereof. For example, in a coarse-time assisted case, determining the location of the mobile device at a remote PDE (SMLC for GSM networks, RNC/SAS for UMTS networks, etc.) with fewer satellite measurements, and in a fine-time assisted case, providing more accurate GPS-time information to increase GPS receiver sensitivity through longer non-coherent integration time and providing a bound on the determined GPS location. In contrast to conventional approaches, embodiments of the present subject matter may address the low satellite visibility problem more effectively and provide a solution for coarse-time assisted GPS cases as well as fine-time assisted GPS cases. For example, in a coarse-time assisted GPS case, embodiments of the present subject matter may provision accurate GPS-system-time relationships directly to the location determining entity (e.g., PDE) substantially in parallel to the mobile device's measurement of satellite signals to thereby reduce phone-to-network data traffic over the air interface, reduce total TTFF, and reduce the number of satellites necessary to solve for the location of the mobile device. In a fine-time assisted GPS case, embodiments of the present subject matter may provide a solution achieving an increase in GPS receiver sensitivity by enhancing the accuracy of fine-time assistance data using a LMU provisioned high accuracy estimate of the GPS-System time relationship at the mobile device. This may reduce the number of satellite measurements required to determine a GPS fix and may allow the GPS receiver to apply a longer non-coherent integration period.

Embodiments of the present subject matter may also provide an exemplary method that employs an initial position estimate to initialize a GPS fixer and provide bounds for the GPS fixer solution to reduce the number of iterations and increase the stability of the GPS fixer. An exemplary initial position estimate of the mobile device may be obtained from uplink measurements from three or more LMUs, or from downlink measurements (e.g., OTDOAs).

In one embodiment, for coarse-time assisted A-GPS an LMU may be employed to measure the range of a mobile device from a cell serving the device using techniques described in U.S. patent application Ser. No. 12/292,821 and continuations thereof, the entirety of each being incorporated herein by reference. The LMU may then combine the measurement(s) of the mobile device range and the GPS-to-System time relationship at the serving site to determine the GPS-to-System time at the mobile device and may thus reduce the number of satellites needed to locate the mobile device to three satellites. In another embodiment, for coarse time assisted A-GPS an LMU collocated with the serving cell or an LMU at a known location from the serving cell may measure the downlink to GPS timing relationship which is then used in conjunction with range measurement information elements from 3G or 4G network measurement messages, e.g., round trip time (RTT) and fine resolution timing advance (TA), respectively, for determining the GPS-System time relationship at the mobile device.

It is an aspect of embodiments of the present subject matter, in coarse-time and fine-time A-GPS cases to provide an increased yield and accuracy of A-GPS location in cases where low satellite visibility is expected. This may be achieved with minimum additional overhead to the phone-to-network data traffic and with minimal impact on TTFF.

One embodiment of the present subject matter provides a method of determining the location of a mobile device. The method includes requesting by a node one or more LMUs to provide timing relationship information from a respective cell site in a communications network and tasking the one or more LMUs to measure uplink times of arrival of signals received by the LMUs from a target mobile device. A response message may be received from the target mobile device, the response message having reference epoch frame information. A GPS time estimate may be determined at the reference epoch that the target mobile device used to make GPS satellite measurements, wherein the determination is performed as a function of the requested LMU timing relationship information. Satellite information may then be determined using the determined GPS time estimate, and a location of the mobile device determined as a function of the determined satellite information.

In another embodiment of the present subject matter a method of determining the location of a mobile device is provided. The method includes requesting by a node one or more LMUs to provide timing relationship information from a respective cell site in a communications network and then tasking these LMUs to measure uplink times of arrival of signals received by the one or more LMUs from a target mobile device. A range from the target mobile device to a serving cell may be determined as a function of the measured uplink times of arrival. A GPS time estimate may then be determined as a function of the requested LMU timing relationship information, and GPS timing fields and corresponding system timing information populated in a fine-time assistance message as a function of the determined GPS time estimate. This fine-time assistance message may then be transmitted to the target mobile device whereby satellite information using GPS timing information reported by the target mobile device can be determined in response to the transmitted fine-time assistance message. A location of the mobile device is then determined as a function of this satellite information.

A further embodiment of the present subject matter provides a method of determining the location of a mobile device. The method includes requesting by a node one or more LMUs to provide timing relationship information from a respective cell site in a communications network and then tasking the one or more LMUs to measure uplink times of arrival of signals received by the one or more LMUs from a target mobile device. An initial position estimate of the target mobile device may be determined using the measured uplink times of arrival measurements. A range from the initial position estimate of the target mobile device to a cell serving the target mobile device may then be determined, and a GPS time estimate determined as a function of the requested LMU timing relationship information. GPS timing fields and corresponding system timing information may be populated in a fine-time assistance message as a function of the GPS time estimate whereby the fine-time assistance message is transmitted to the target mobile device. Satellite information may be determined using GPS timing information reported by the target mobile device in response to the transmitted fine-time assistance message, and a location of the target mobile device determined as a function of the determined satellite information.

DETAILED DESCRIPTION

With reference to the figures, where like elements have been given like numerical designations to facilitate an understanding of the present subject matter, the various embodiments for enhancing Assisted Global Positioning System (A-GPS) location accuracy and yield with location measurement units (LMUs) and network timing measurements are described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof. The terms "device," "handset," "terminal," and "station" are utilized interchangeably through the present disclosure and such use is not intended to limit the scope of the claims appended herewith. It should also be noted that the terms "node(s)" and "site(s)" and "station(s)" are also utilized interchangeably through the present disclosure and such use is not intended to limit the scope of the claims appended herewith.

Figure 1:
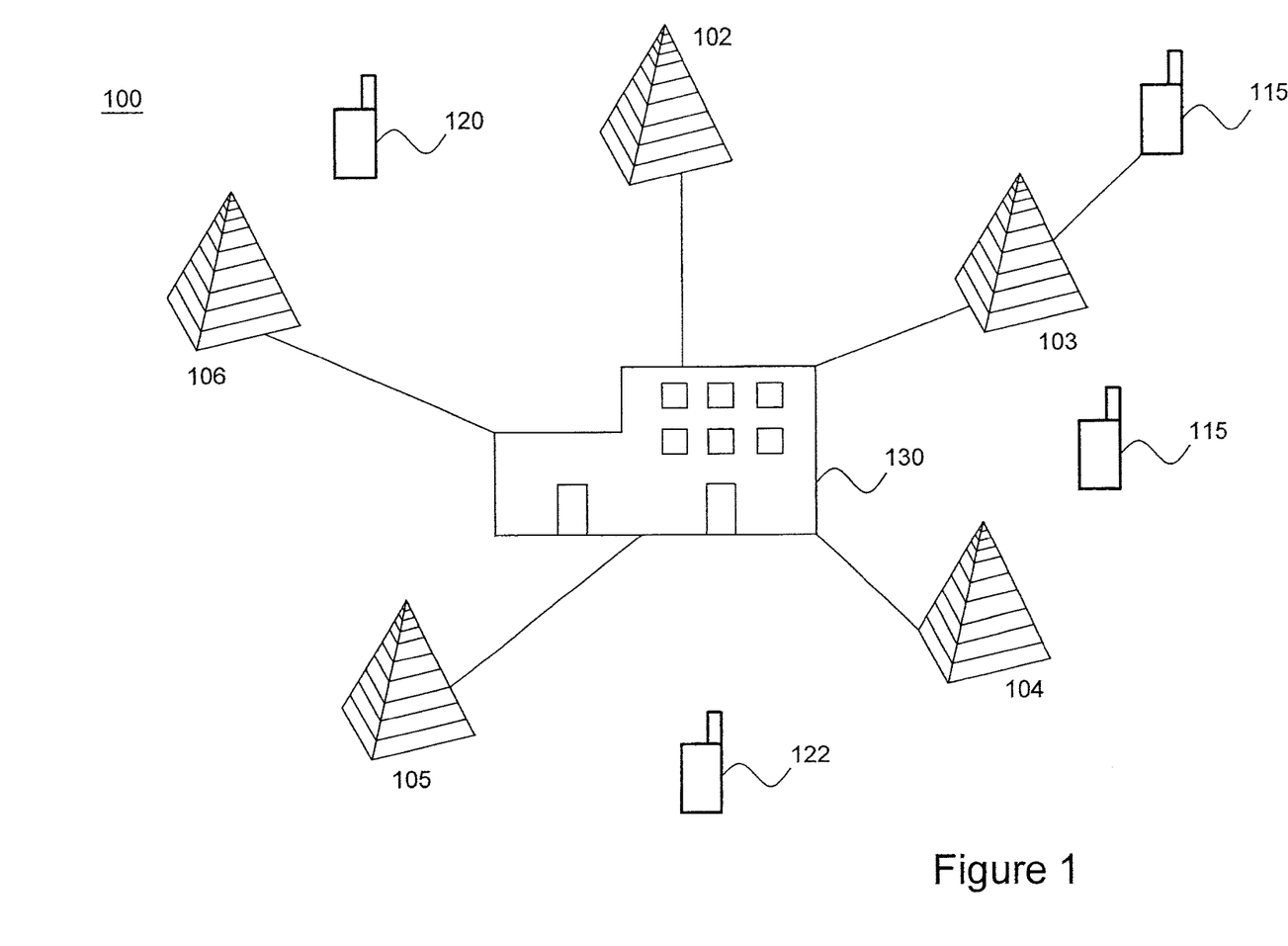
FIG. 1 is an illustration of a wireless communications network according to an embodiment of the present subject matter.

FIG. 1 is an illustration of a wireless communications network according to an embodiment of the present subject matter. With reference to FIG. 1, a wireless communications network 100 or system is shown. The network may be a Universal Mobile Telecommunications System (UMTS) network, a Global System for Mobile Communication (GSM) network, a Time Division Multiple Access (TDMA) network, Code Division Multiple Access (CDMA) network, a Worldwide Interoperability for Microwave Access (WiMax) network, a WiFi network, networks utilizing Evolution-Data Optimized (EVDO), CDMA2000 network, Long Term Evolution (LTE), 1 times Radio Transmission Technology (1xRTT) standards or another equivalent network.

Location measurement units (LMUs) 115 may be dispersed throughout the system or subsystem reception area. These LMUs 115 may be integrated with a base station 102-106 or may be independent of a base station 102-106. The wireless network 100 serves mobile stations or devices 120, 122 within reception range of at least one of the base stations 102-106. Mobile stations 120, 122 may include cellular telephones, text messaging devices, computers, portable computers, vehicle locating devices, vehicle security devices, communication devices, wireless transceivers or other devices with a wireless communications interface. Base station transceivers 102-106, also commonly referred to simply as base stations or nodes, are connected to a central entity or central network unit 130. The central entity 130 may be a base station controller (BSC) in a base station subsystem (BSS), a Radio Network Controller (RNC) in a Radio Access Network (RAN), or, for GSM, General Packet Radio Service (GPRS) or UMTS system, an SMLC or an equivalent. The connection from each base station to a BSC, SMLC or other central network entity may employ a direct transmission link, e.g., a wired connection, microwave link, Ethernet connection, and the like, or may be employed by one or more intermediate entities, e.g., an intermediate BSC in the case of a connection from a BTS to an SMLC for GSM. Each mobile station 120, 122 may periodically measure the transmission timing difference between pairs of base stations 102-106. For example, a mobile station 120 may measure the difference in transmission timing for communication from its serving base station 102 and from one or more neighboring base stations, e.g., 106 and/or 103.

Figure 2:
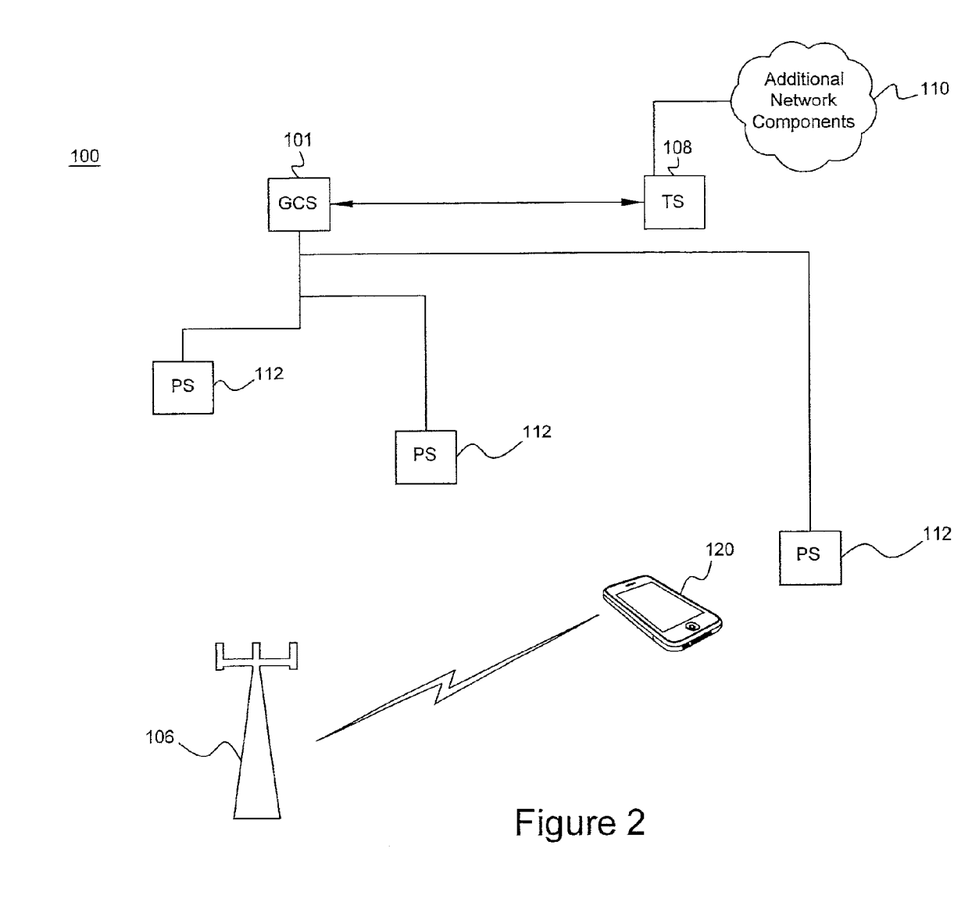
FIG. 2 is a diagram of a basic architecture for one embodiment of the present subject matter.

FIG. 2 is a diagram of a basic architecture for one embodiment of the present subject matter. With reference to FIG. 2, a mobile device 120 of interest may be in communication with a base station 106 in an exemplary communications network 100. A Geolocation Control System (GCS) 101 in the network 100 may receive tasking from a Tasking Server (TS) 108. An exemplary network may be a UMTS network, a GSM network, a TDMA network, CDMA network, a WiMax network, a WiFi network, networks utilizing EVDO, a CDMA2000 network, LTE, and 1xRTT standards or another equivalent network. The TS 108 may be operably connected to other components 110 of the communications network 100. The network 100 may also include one or more Positioning Determination Units (PDU) 112 or other sensors or LMUs depicted in FIGS. 1 and/or 2. Of course, these sensors, units and equivalents may also be co-located or remote from other sensors, units and/or stations. These PDUs 112 may receive a location request from the GCS 101 and may attempt to detect the mobile device 120 of interest. Any one or each PDUs 112 may also report the quality of its detection measurements to the GCS 101. In other embodiments of the present subject matter, the TS 108 may be embedded in certain network core components (e.g., SMLC, Stand Alone SMLC (SAS), etc.). The TS 108 may also be embedded within one or more PDUs 112 (to receive off-the-air tasking), supplied by an independent receiver apparatus, or embedded in a complementary repeater or antenna system.

In one exemplary system, a location center (e.g., SMLC for a GSM network, RNC/SAS for a UMTS network, etc.) may communicate with a BSC over the telecommunications network. It should be noted that the respective GSM and UMTS standards specify messages for communication between the SMLC and mobile device via the BSC and BTS and this messaging will not be further discussed herein. An LMU may communicate information to the SMLC using a custom software link to assist in the determination of the location of a target mobile device from satellite measurements, or pseudo-ranges. Conventionally, this location determination may require a minimum of five pseudo-ranges to solve for the five unknowns, i.e., three dimensional location coordinates (x, y, z), mobile device clock drift or bias, and GPS time or bias. Embodiments of the present subject matter, however, may reduce the minimum needed satellite measurements and increase the yield of A-GPS in environments that typically suffer from low satellite visibility, such as urban canyons and indoor locations.

In one embodiment of the present subject matter, A-GPS location determination using coarse-time assistance is addressed, and in another embodiment of the present subject matter, A-GPS location using fine-time assistance is addressed. In one coarse-time assistance embodiment, an LMU may reduce the minimum number of required pseudo-ranges to four or three pseudo-ranges if the surface of the earth is introduced as an additional measurement surface thereby increasing yield, reducing computation load needed to determine GPS time, and minimizing data traffic exchanged between the mobile device and communications network. This may be achieved without impacting TTFF as the information to determine satellite measurement GPS time may be retrieved substantially in parallel with the mobile device performing the necessary satellite measurements. In the fine-time assistance embodiment, an LMU may enhance an exemplary A-GPS location system by increasing the accuracy of the fine-time assist information and providing a more accurate estimate of a reference location for a device which determines a GPS fix (e.g., a "GPS fixer"). Higher accuracy fine-time assistance information may result in an increased GPS receiver sensitivity due to the respective mobile device's ability to employ a longer non-coherent integration time. Furthermore, a more accurate reference location may be provisioned using multiple LMUs and/or using OTDOA measurements to assist a GPS fixer in solving for the location of the mobile device with fewer iterations and with greater stability. Thus, increasing GPS receiver sensitivity and GPS fixer stability with exemplary techniques according to embodiments of the present subject matter may achieve a better A-GPS yield than conventional fine-time assistance methods, especially in environments having low satellite visibility, e.g., urban canyons and indoor locations.

In coarse-time assisted GPS cases, a mobile device may receive information that coarsely indicates the GPS-system time relationship (GPS-GSM, GPS-UMTS, GPS-LTE, etc.). Thus, the mobile device's estimate of the GPS time may be in error by several seconds. While the mobile device may still be able to detect satellite frames, the device does not have precise timing information on the expected GPS frame timing and thus cannot maximize its respective GPS receiver sensitivity. In embodiments of the present subject matter, however, the mobile device may select a reference epoch for detecting GPS satellite signal frames that is dependent on cellular network timing, such as a broadcast control channel (BCCH) frame in GSM, system frame number (SFN) in UMTS and LTE, and the like. Thus, an exemplary mobile device may essentially time stamp the satellite measurements with a system time marker, e.g., in the case of GSM, a BCCH frame number.

Figure 3:
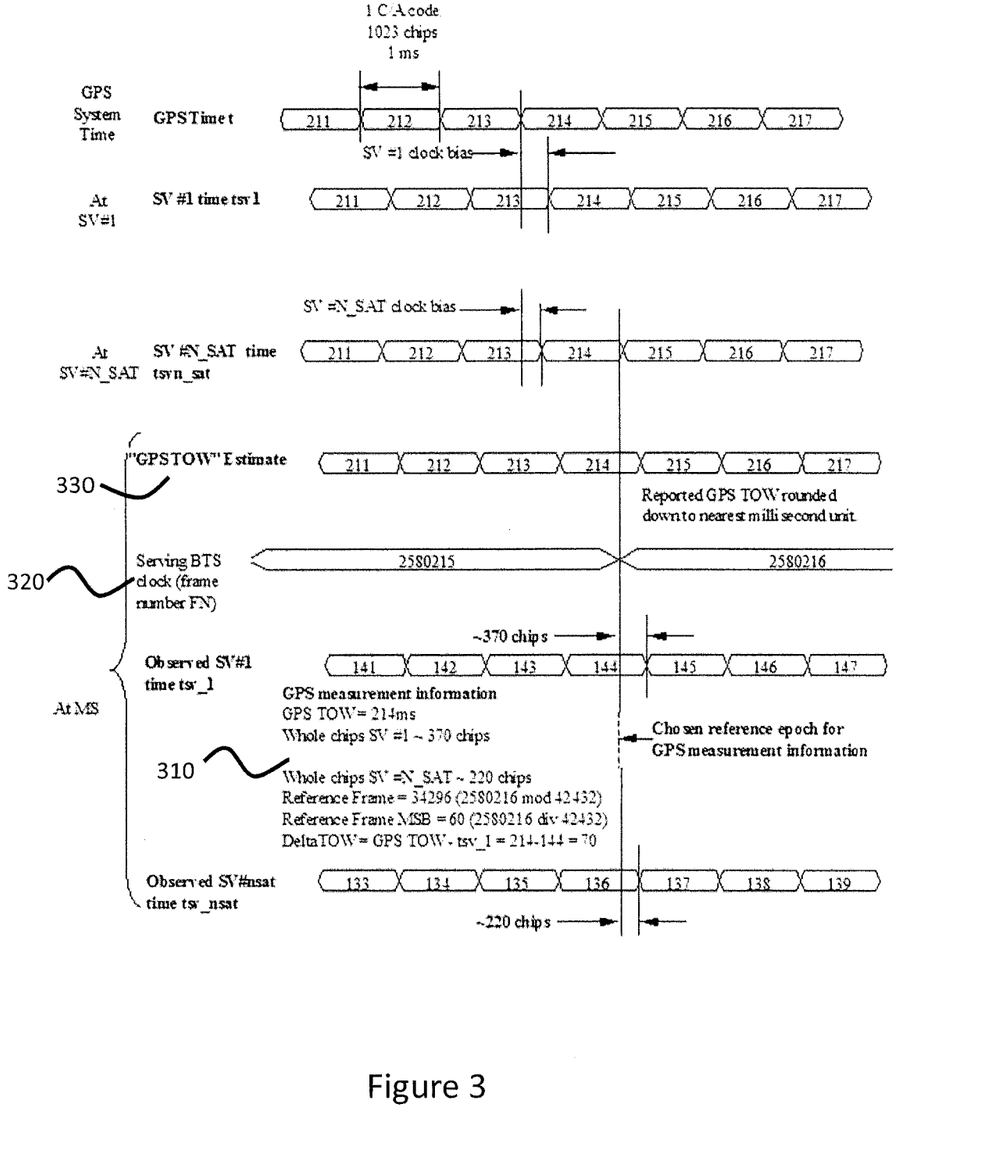
FIG. 3 is a graphical depiction of relevant timing relationships for a mobile device using the 3GPP standard.

FIG. 3 is a graphical depiction of relevant timing relationships for a mobile device using the 3GPP standard. With reference to FIG. 3, the purpose of a GPS Measurement Information element 310 is to provide GPS measurement information from a mobile device to an SMLC or equivalent component. This information may include the measurements of code phase and Doppler enabling a network-based GPS method to determine location. FIG. 3 also provides an illustration of the relationships between some of the fields in the GPS Measurement Information element 310 and visually depicts where embodiments of the present subject matter may consider timing relationships that result in a mobile device's calculation of its perceived GPS time at the instant of code-phase measurement. A mobile device of interest may populate the GPS-GSM timing information in the GPS Measurement Information element 310 and GPS Time Assistance Measurement element of the respective Measure Position Response message. Tables 1 and 2 below provide exemplary and non-limiting details of some of these information elements.

TABLE 1

GPS Measurement Information element content

| Element fields | Presence | Occurrences |
|---|---|---|
| Reference Frame | O | 1 |
| GPS TOW | M | 1 |
| # of Satellites (N_SAT) | M | 1 |
| Measurement Parameters | M | N_SAT |

TABLE 2

GPS Time Assistance Measurement Information element content

| Element fields | Presence |
|---|---|
| Reference Frame MSB | O |
| GPS TOW Subms | O |
| Delta TOW | O |
| GPS Reference Time Uncertainty | O |

In one embodiment of the present subject matter, a Reference Frame FN 320 number may then be determined by an SMLC using the following relationship:

$$FN = \text{Reference Frame } MSB*42432 + \text{Reference Frame} \quad (1)$$

where Reference Frame represents the BCCH frame number received by the mobile device that is within a predetermined time period (e.g., approximately 1 msec) of the instance where the GPS Time of the Week (TOW) field is populated by the mobile device. This time represents the mobile device's version of GPS time 330 and may be in error by as much as 10 seconds and thus may translate to GPS satellite position changing by as much as 38 kilometers along its orbit. If, however, an exemplary LMU(s) detects the BCCH broadcast by the serving cell of the same mobile device that is reporting the Reference Frame number, the LMU(s) may be used to provide the GPS-GSM timing relationship and then a node, e.g., SMLC and the like, using the LMU provisioned GPS-GSM timing relationship and an estimate of serving site to mobile device propagation delay, $\tau_p$, may deduce the correct the GPS timing relationship (e.g., GPS TOW field) in the GPS Measurements Information element. This corrected GPS TOW may then be used to reposition the satellites according to the ephemeris data within the SMLC resulting in a minimum of three rather than four or five satellites may be used to determine a geographic fix and may result in less iterations for the solution to converge due to a reduced order of the solution equations.

In one embodiment, the mobile device may employ a system frame as a reference epoch when the SMLC includes the GPS Time Assistance Measurement Request element in the Measure Position Request message that the SMLC sends to the mobile device. This is discussed in Section A.2.2.4a in TS 44.031, the entirety of which is incorporated herein by reference. For 3G and 4G, the 3GPP standard defines a similar messaging scheme to control when the mobile device should use the start of a system frame as a reference epoch for GPS measurements. With this message the mobile device may be requested to send a system frame number (SFN) used for the GPS reference epoch in a response message (e.g., a Measure Position Response message) to the SMLC. In one embodiment of the present subject matter, an exemplary technique may be used to determine the actual GPS time of the reference frame epoch marker selected by the mobile device by using an LMU collocated at the serving site of the mobile device.

To achieve maximum accuracy of this GPS time estimate, it may be insufficient to determine the measured GPS-system time relationship at the serving site. Rather, the propagation delay between the mobile device and the serving site, $\tau_p$, should be accounted for as well. Considering the determination of $\tau_p$, a communication link between a mobile device or station (MS) and a serving base station (BS) may be established. Markers $M_1$ on the downlink channel (BS to MS) and markers $M_2$ on the uplink channel (MS to BS) may appear in some pre-defined manner. Assuming that the respective communication protocol forces the MS to align its markers $M_2$ in a predefined manner (defined by a parameter P communicated within the network) with respect to the receive time (at the MS) of the downlink markers $M_1$, it follows that the uplink markers $M_2$, when viewed at the MS, are aligned such that they are separated in time with respect to the downlink markers $M_1$ by some time interval f(P).

Considering now an observer at some location $L_{obs}$ is capable of monitoring the downlink transmissions from the serving base station, it may be assumed that the location of the serving BS is Lbs and that the observer knows both locations $L_{obs}$ and $L_{bs}$. The observer may then determine the exact transmission time of the marker $M_1$ by determining when the marker $M_1$ was observed at $L_{obs}$ and subtracting the transmission time for the signal from Lbs to $L_{obs}$. Let this transmission time be denoted by $t_F$ whereby the observation $t_F$ may or may not be time-stamped using the GPS clock. If the locations $L_{obs}$ and Lbs are coincident or close to each other, the time of transit from the MS to the serving BS may be determined. Let the time of transmission of a marker $M_2$ at the MS be $t_M$, and it follows that $t_M$ is given by the relationship $$t_M = t_F + \tau_p - f(P) \tag{2}$$

where $\tau_p$ represents the one way propagation time between the BS and the MS.

This transmission is received at $L_{obs}$ at time $t_R$ where $$t_R = t_M + \tau_p \tag{3}$$

Solving for $\tau_p$ one obtains the propagation time from the MS to the serving BS as $$\tau_p = \frac{1}{2}(t_R - t_F + f(P)) \tag{4}$$

Figure 4:
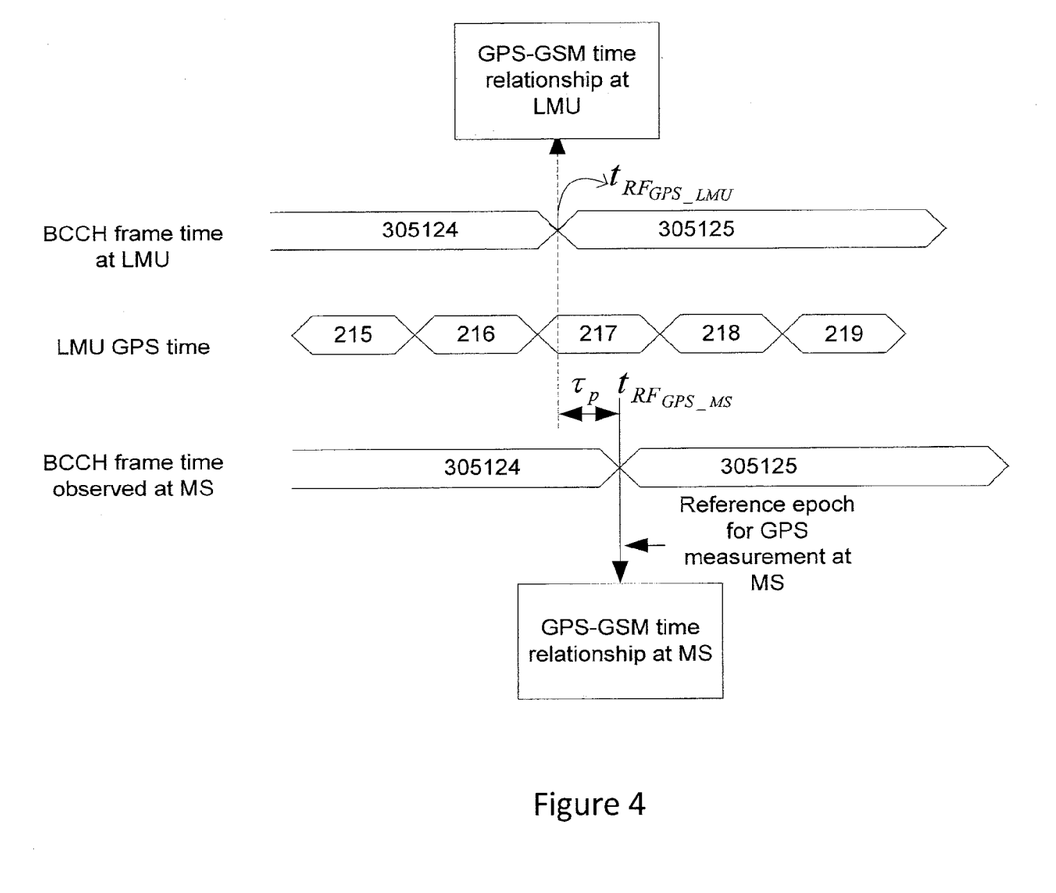
FIG. 4 is a graphical illustration of the relationship between GPS-GSM timing relationship terms.

Knowing the propagation delay from the serving site to the MS allows one to estimate the GPS time at the reference epoch that the MS used to make GPS measurements. This GPS time estimate, denoted by $$t_{RF_{GPS\_MS}}$$

may be determined as $$t_{RF_{GPS\_MS}} = t_{RF_{GPS\_LMU}} + \tau_p \tag{5}$$

where the term $$t_{RF_{GPS\_LMU}}$$

represents the GPS-GSM, or GPS-System, timing relationship measured by the LMU at the site that is serving the MS of interest. FIG. 4 is a graphical illustration of the relationship between the $$t_{RF_{GPS\_MS}}, t_{RF_{GPS\_LMU}},$$

and $\tau_p$ terms in Equation (5) above.

In general, Equation (5) captures the GPS-system-time relationship at the MS. This relationship may be determined using an LMU and may be communicated to the SMLC. The SMLC/SAS may, therefore, have access to the actual GPS time at which the mobile device made the code phase measurement in response to an A-GPS location request. The SMLC may then use this relationship to determine the actual GPS timing relationship (e.g., GPS TOW) of the reference frame in the GPS measurements information message.

In one embodiment, an exemplary process for determining a GPS timing relationship at an SMLC may include periodically requesting one or more LMUs (collocated with cell sites or otherwise) to send measured GSM-GPS BCCH timing relationships at each cell site. Of course, other timing relationships may be determined and or measured and the identification of a GPS timing relationship and/or GSM-GPS BCCH timing relationship should not limit the scope of the claims appended herewith. The SMLC may then receive a location request message for a target mobile device which contains tipping information for the device and may include uplink RF description and the serving site identification. In response to the location request, the SMLC may send to the target mobile device a request message, such as, but not limited to, a Measure Position Request message including a GPS Time Assistance Measurement Request element. The SMLC may also task the LMU to measure the uplink Times of Arrival (TOA) of signals received by the LMUs from the target mobile device. The mobile device may receive the Measure Position Request and make satellite measurements with a chosen reference epoch being a downlink Reference Frame (e.g., FN=305125 in FIG. 3). The mobile device may then transmit a response message, such as, but not limited to, a Measure Position Response message, to the SMLC with reference epoch frame number information contained in the Reference Frame and the Reference Frame MSB information elements (which are part of the GPS Measurement Information and GPS Time Assistance Measurement components of the response message, respectively). The SMLC may employ this received information and determine the actual GPS timing relationship (e.g., GPS TOW) of the Reference Frame when the mobile device made the GPS measurements using the relationships described above. The timing advance (TA) parameter needed for the computation of $\tau_p$ in Equation (5) above may either be decoded at the LMU or from the SMLC via the Lb interface. The SMLC may use the actual GPS TOW instead of the mobile device's reported GPS TOW to place the satellites from ephemeris data, and the SMLC or GPS fixer may then determine the location of the mobile device using satellite information from a minimum of three satellites.

In another embodiment, at the cost of increased TTFF, the SMLC may increase the yield of an A-GPS location of a mobile device by sending fine-time assistance data utilizing an estimated distance of the mobile from the serving cell site, $\tau_p$, which is determined using Equation (4) above. This may improve the accuracy of the fine time assist to the order of ±1 microsecond instead of ±10 microseconds as specified by the 3GPP standard (see, e.g., TS 34.171) and may result in higher sensitivity due to longer non-coherent integration time of GPS signals received by the respective mobile device's GPS receiver. An exemplary method to determine the range from the serving site to the mobile device, $\tau_p$, is the same method proposed for the coarse-time assisted case using Equation (4) above. The SMLC may then determine the enhanced accuracy GPS-System time relationship from the following equation:

$$t_{System_{MS}} = t_{System_{LMU}} \tau_p \tag{6}$$

where $t_{System_{LMU}}$ represents system time expressed in terms of GPS time, e.g., the GPS time stamp of a bit within a system frame, or SFN for 3G/4G, at the serving cell site, and $t_{System_{MS}}$ represents system time in terms of GPS time for the same bit within the same frame at the mobile. Thus, the SMLC may use this GPS-System time relationship at the mobile device $t_{System_{MS}}$ to populate a GPS TOW field in an exemplary fine-time assist message.

The following is one non-limiting and exemplary process that may be adopted by an SMLC to provide enhanced fine-time assist. The SMLC may first periodically request from LMUs collocated (or otherwise) with cell sites to send their respective GSM-GPS BCCH timing relationship $t_{System_{LMU}}$. Of course, other timing relationships may be determined and or measured and the identification of a GSM-GPS BCCH timing relationship should not limit the scope of the claims appended herewith. The SMLC may then receive a location request message containing tipping information for the target mobile device, the tipping information including uplink RF description, the serving site ID, and other information. In response to the location request, the SMLC may first task an LMU to measure uplink TOAs of signals received by the LMUs from the target mobile device and determine a range to the mobile device using Equation (4) above. The TA parameter needed for the computation of $\tau_p$ in Equation (5) may either be decoded at the LMU or from the SMLC via the Lb interface. The SMLC may then receive range information from the LMU and employ the relationship defined by Equation (6) to determine the GPS time of a future GPS TOW which occurs a predetermined time in the future (e.g., the assumption is that the SMLC has GPS time within a few millisecond accuracy). The SMLC may then populate the GPS TOW information and corresponding system timing information in the fine-time assistance message and send this information to the mobile device. The mobile device may then receive the fine-time assistance message, set its respective real-time clock to the GPS time according to the fine-time assist message, and perform the necessary measurements of satellite signals using, in one embodiment, long integration time to increase the GPS receiver sensitivity. The mobile device may then transmit a response message back to the SMLC with a GPS TOW of the reference epoch used for the satellite measurements whereby the SMLC uses the reported GPS TOW to place the satellites using ephemeris data. The SMLC or GPS fixer may then determine a location of the mobile device using satellite information from a minimum of three satellites.

In an alternative embodiment, the propagation delay from the serving site to the mobile device may be estimated from network measurements, such as, but not limited to, TA and round trip time (RTT). For example, in a UMTS network, the RTT measurement may be provided in information requested by the SMLC, such as, but not limited to, measurement reports, and propagation delay may be determined as $$\tau_p = \frac{1}{2} RTT_{UMTS} \tag{7}$$

In an LTE network, the LTE standard specifies an information element called Timing Advance $T_{ADV}$ reported by the UE and defined in 3GPP TS 36.214, the entirety of which is incorporated herein by reference. For example, when TA Type 1 is available to an E-SMLC, it may be used to estimate the propagation delay of the UE from the serving cell can be determined as $$\tau_p = \frac{1}{2}(TA_{type\_1}) \tag{8}$$

When TA Type 2 is available to the E-SMLC, the propagation delay from the serving base cell can be determined as $$\tau_p = \frac{1}{2}(TA_{type\_2}) \tag{9}$$

The propagation delay determined from Equations (7), (8) and/or (9), may then be used in place of Equation (4) in the procedures outlined above, to determine the location of the mobile device.

Another embodiment to enhance a fine-time assist A-GPS location may be to utilize three or more LMUs, where any one LMU is located at a site serving the target mobile device and two or more LMUs are located at neighboring sites, or three or more LMUs are located at neighboring sites. In these cases, in addition to receiving the GPS-System time information from an LMU at a site closest to the serving site, the SMLC may also receive from multiple LMUs, which are located at neighboring sites, uplink TOA measurements $t_{R_j}$ and use these uplink TOA measurements to determine a first pass location estimate of the phone using an exemplary MREL technique or other technique. This first pass or initial position estimate of the mobile device may then be used to determine the distance between the mobile device and the serving cell using the relationship $$\tau_p = \text{distance}(\text{Serving cell}(x,y), \text{initial phone location}(\widehat{x,y}) \tag{10}$$

The SMLC may use the mobile device's distance from the serving site, $\tau_p$, and the measured GPS-System time relationship at the serving site to populate the fine time assistance information and sends the information to the mobile device in the Location Request message. Upon receiving a Location Response message from the mobile device, the SMLC may make further use of the initial phone location, $(\widehat{x,y})$, to initialize the GPS fixer at that location and restrict the GPS fixer solution to some boundary around the initial location.

The following is a non-limiting exemplary process employed by an SMLC to provide an enhanced fine-time assist. An SMLC may periodically request from LMUs (collocated with cell sites or otherwise) a GSM-GPS BCCH timing relationship at each cell site. Of course, other timing relationships may be determined and or measured and the identification of a GSM-GPS BCCH timing relationship should not limit the scope of the claims appended herewith. Upon receipt of a location request message by the SMLC, the SMLC may first task the LMUs to measure uplink TOAs at serving and neighboring sites and may determine an initial position estimate of the mobile device using uplink measurements employing techniques detailed in U.S. patent application Ser. No. 12/292,821 and continuations thereof, the entirety of each are herein incorporated by reference, and also detailed in U.S. patent application Ser. No. 13/112,690, the entirety of which is incorporated herein by reference. The SMLC may then determine the range from the estimated location of the mobile device to the serving cell, $\tau_p$, according to Equation (10) above, and the SMLC may determine the GPS time of a future GPS TOW as noted in Equation (6). The SMLC may then populate the GPS TOW and corresponding system timing information in the fine-time assistance message and send the same to the mobile device. The mobile device may then receive the fine-time assistance message and set its respective real-time clock to the GPS time according to the fine-time assist message. The mobile device then performs the necessary satellite measurements using long integration time to thus increase GPS receiver sensitivity and sends a response message back to the SMLC with satellite measurements and the GPS TOW of the reference epoch that the mobile device used for the measurements. The SMLC uses the reported GPS TOW to place the satellites using ephemeris data and may use the initial estimate of the mobile, $\widehat{(x,y)}$, to initialize the iterative A-GPS fixer and provide bounds for the GPS fixer solution. The SMLC fixer may then determine the location of the mobile device using satellite information from a minimum of three satellites.

In yet another embodiment, observed time difference of arrival (OTDOA) measurements may be used to obtain an initial location estimate of the mobile device. OTDOA was developed for use in WCDMA networks, especially in UMTS and CDMA2000 networks. In this embodiment, a mobile device may measure the TDOA of signals from pairs of base stations. If the base stations are not synchronized (as in GSM and UMTS), an LMU may be used to estimate the transmission time offset between the base stations. If sufficient independent OTD measurements are available, then the additional information may be used to estimate the transmission time offset. Once the initial estimate of the mobile location using OTDOA, $\widehat{(x,y)}_{OTDOA}$, is determined, the estimate of propagation delay may be obtained using the following equation:

$$\tau_p = \text{distance}(\text{Serving cell}(x,y), \text{initial phone location}(\widehat{x,y})_{OTDOA}) \quad (11)$$

The SMLC may then follow the methods described in previous embodiments to determine the location of the phone.

Additional logic may also be included in an exemplary PDE (SMLC, RNC/SAS, etc.) to adaptively invoke the set of techniques described in the present subject matter so there is very minimal or no impact on TTFF. For example, if the location request comes from a call whose serving site is in an urban canyon where the satellite hearability is expected to be minimal, it may be beneficial to provide coarse-time or fine-time assistance as explained above. In an alternative embodiment, one may perform an initial fix, examine the GDOP of the resulting fix and determine whether to invoke the techniques described herein.

While the discussion above has referenced certain exemplary networks such as GSM and UMTS networks, the disclosure herein should not be so limited. For example, the principles discussed herein are equally applicable to other networks such as, but not limited to, a TDMA network, CDMA network, a WiMax network, a WiFi network, networks utilizing EVDO, a CDMA2000 network, LTE, and 1xRTT standards or another equivalent networks or other networks that may include a system clock or equivalent. Such exemplary system clocks may thus be utilized by embodiments of the present subject matter to determine timing relationships relevant herein. By way of a non-limiting example, a system clock in a WiFi network may be employed to determine a GPS timing relationship, e.g., GPS-to-System relationship, which may ultimately be used to reduce the number of satellites needed to locate a mobile down to three satellites, enhance the accuracy of the fine-time assistance data, etc.

Figure 5:
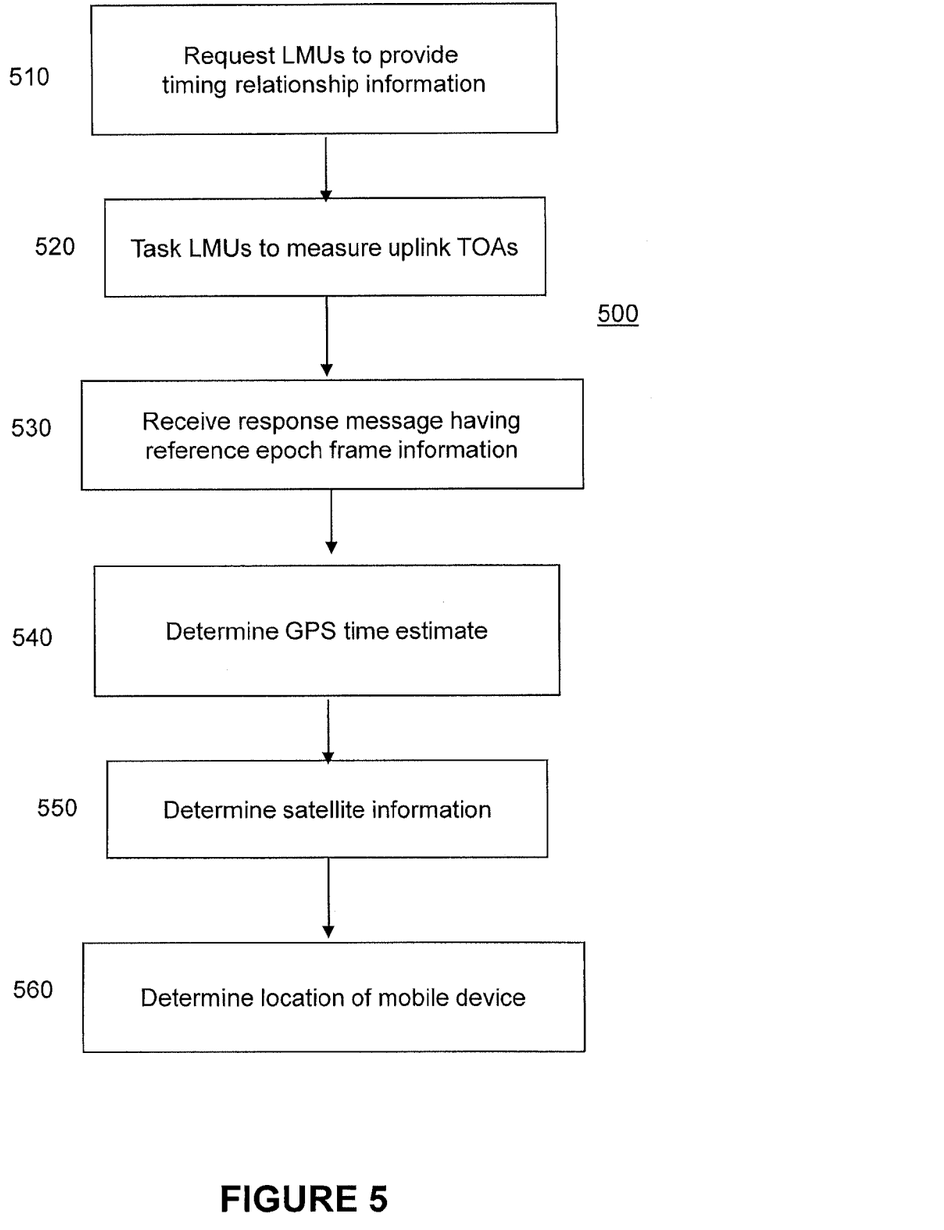
FIG. 5 is a block diagram of one embodiment of the present subject matter.

FIG. 5 is a block diagram of one embodiment of the present subject matter. With reference to FIG. 5, a method 500 is provided for determining the location of a mobile device. At step 510, a node may request timing relationship information from a respective cell site in a communications network. In the depicted, non-limiting embodiment, this request is made of one or more LMUs. An exemplary node may be, but is not limited to, a SMLC, SAS, RNC and the like. Further, the timing relationship information may be, but is not limited to, GSM-GPS BCCH information and SFN information. In one embodiment, the method may include the steps of receiving a location request by the node for a target mobile device and transmitting a request message to the target mobile device in response to the location request. In another embodiment, the request message includes GPS time assistance measurement request elements. The location request may include one or more of tipping information for the target mobile device, uplink signal radio frequency information, and serving site identification. Additionally, the embodiment may include receiving the position request by the target mobile device, and receiving signals from one or more satellites as a function of information in the position request, the information including a selected reference epoch.

In embodiments having LMUs, the one or more LMUs may also be tasked at step 520 to measure uplink times of arrival of signals received by the LMUs from a target mobile device. Of course, in embodiments without LMUs, components or nodes in the network would measure these uplink times of arrival. The steps of transmitting a request message and tasking one or more LMUs may be performed at substantially the same time. At step 530, a response message from the target mobile device may be received, the response message having reference epoch frame information, and at step 540, a GPS time estimate determined at the reference epoch that the target mobile device used to make GPS satellite measurements. This determination is performed as a function of the requested timing relationship information. In one embodiment, step 530 may include receiving a response message from the target mobile device, the response message having reference epoch frame number information in a reference frame and having reference frame information elements. In another embodiment, the determined GPS time estimate may be determined using the relationship given in Equation (5) above. At step 550, satellite information may be determined using the determined GPS time estimate, and a location of the mobile device determined as a function of the determined satellite information at step 560. An exemplary communications network may be, but is not limited to, a UMTS network, GSM network, TDMA network, CDMA network, WiMax network, WiFi network, CDMA2000 network, and a network utilizing EVDO, LTE, or 1xRTT standards.

Figure 6:
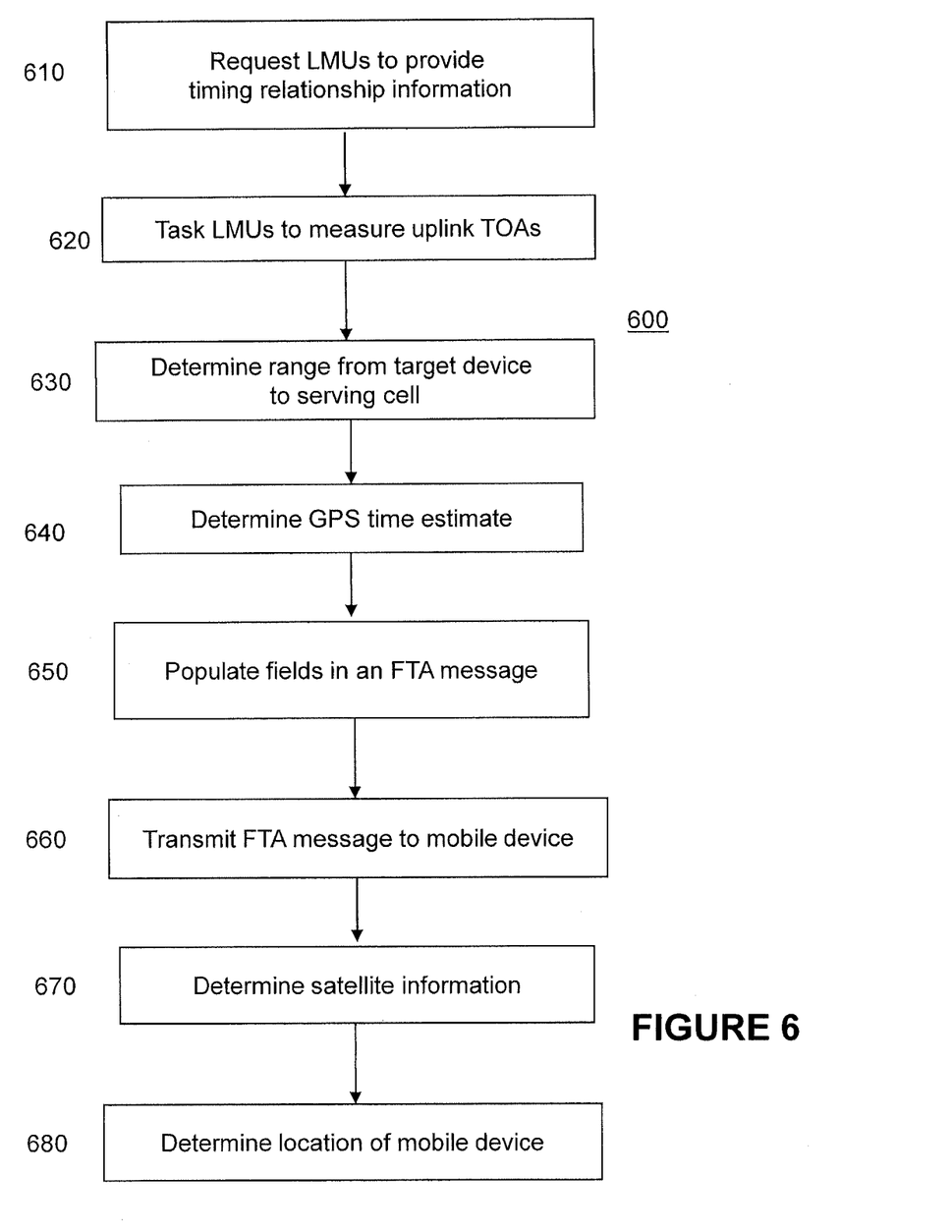
FIG. 6 is a block diagram of another embodiment of the present subject matter.

FIG. 6 is a block diagram of another embodiment of the present subject matter. With reference to FIG. 6, a method 600 is provided for determining the location of a mobile device. At step 610, a node may request timing relationship information from a respective cell site in a communications network. In the depicted, non-limiting embodiment, this request is made of one or more LMUs. An exemplary node may be, but is not limited to, a SMLC, SAS, RNC and the like. Further, the timing relationship information may be, but is not limited to, GSM-GPS BCCH information and SFN information. These LMUs or other components may be tasked at step 620 to measure uplink times of arrival of signals received by the one or more LMUs from a target mobile device. At step 630, a range from the target mobile device to a serving cell may be determined as a function of the measured uplink times of arrival. A GPS time estimate may then be determined at step 640 as a function of the requested timing relationship information. In one embodiment, the determined GPS time estimate may be determined using the relationship given in Equation (6) above. GPS timing fields and corresponding system timing information may be populated in a fine-time assistance message as a function of the determined GPS time estimate at step 650. This fine-time assistance message is then transmitted to the target mobile device at step 660. The satellite information, determined at step 670, containing GPS timing information is then reported by the target mobile device in response to the transmitted fine-time assistance message. In one embodiment, the method may further include receiving the fine-time assistance message by the target mobile device, receiving signals from one or more satellites as a function of information in the fine-time assistance message, and transmitting a response message to the node with satellite measurements and GPS timing information. At step 680 a location of the mobile device can be determined as a function of the determined satellite information.

Figure 7:
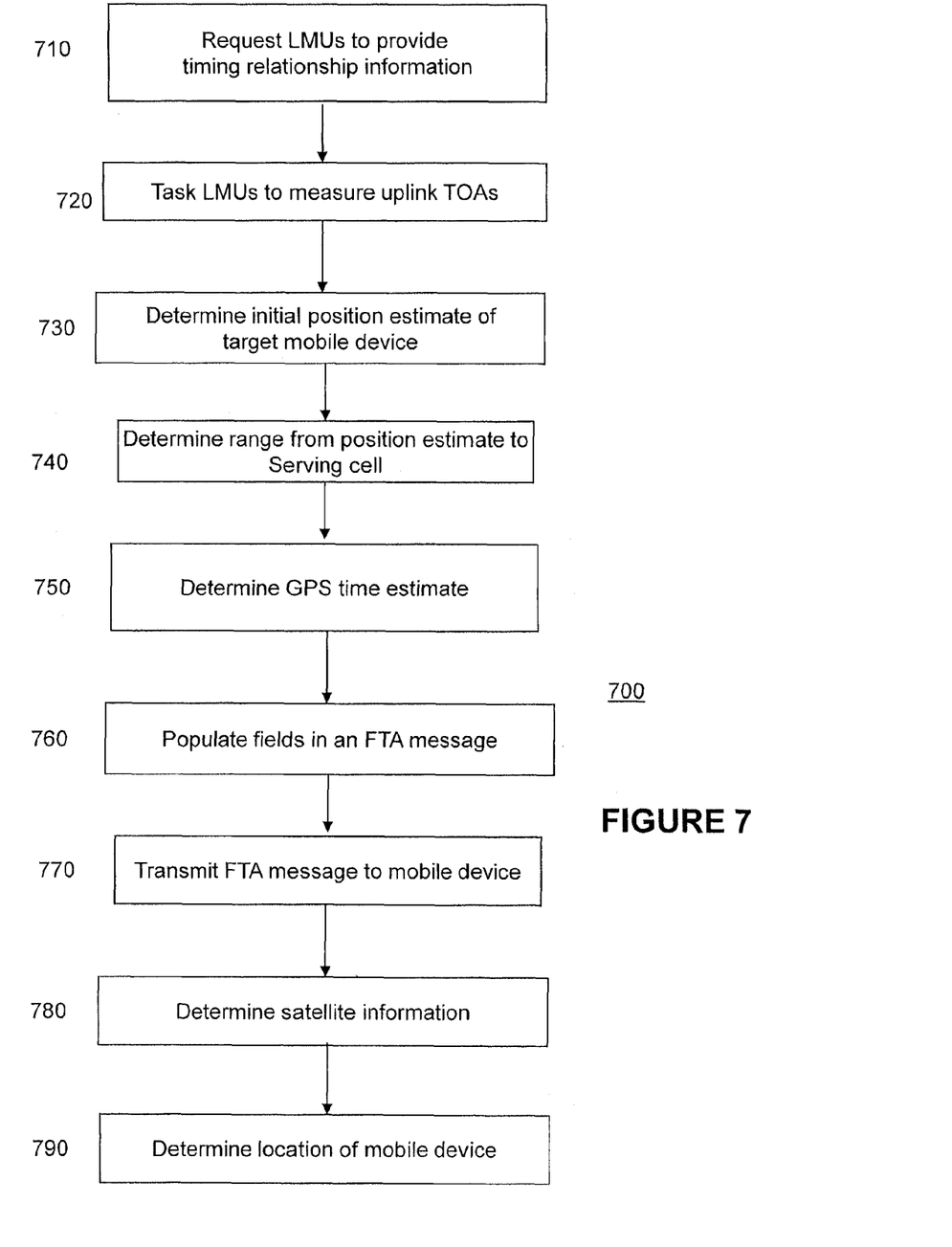
FIG. 7 is a block diagram of a further embodiment of the present subject matter.

FIG. 7 is a block diagram of a further embodiment of the present subject matter. With reference to FIG. 7, a method 700 is provided for determining the location of a mobile device. At step 710, a node may request timing relationship information from a respective cell site in a communications network. In the depicted, non-limiting embodiment, this request is made of one or more LMUs. An exemplary node may be, but is not limited to, a SMLC, SAS, RNC and the like. Further, the timing relationship information may be, but is not limited to, GSM-GPS BCCH information and SFN information. These LMUs or other components may be tasked at step 720 to measure uplink times of arrival of signals received by the one or more LMUs from a target mobile device. One or more of the LMUs may or may not be collocated with cell sites. At step 730, an initial position estimate of the target mobile device may be determined using the measured uplink times of arrival measurements, and at step 740 a range from the initial position estimate of the target mobile device to a cell serving the target mobile device may be determined. In additional embodiments, step 740 may include determining a range as a function of the relationships defined in Equations (7), (8), (9) above. In another embodiment, step 740 may include determining a range as a function of the relationship defined in Equation (10) above. Step 730 may include in an alternative embodiment, using observed time difference of arrival of signals received by the target mobile device to determine the initial position estimate. In this embodiment, the determined range in step 740 may include determining the range as a function of the relationship defined in Equation (11) above.

At step 750, a GPS time estimate may be determined as a function of the requested timing relationship information. In one embodiment, the determined GPS time estimate may be determined using the relationship given in Equation (6) above. GPS timing fields and corresponding system timing information may then be populated in a fine-time assistance message as a function of the GPS time estimate at step 760. This fine-time assistance message is then transmitted to the target mobile device at step 770 whereby satellite information is determined at step 780 using GPS timing information reported by the target mobile device in response to the transmitted fine-time assistance message. In one embodiment, the method may further include receiving the fine-time assistance message by the target mobile device, receiving signals from one or more satellites as a function of information in the fine-time assistance message, and transmitting a response message to the node with satellite measurements and GPS timing information. At step 790, a location of the target mobile device may be determined as a function of the determined satellite information.

The present disclosure may also be implemented by a general purpose computer programmed in accordance with the principals discussed herein. It may be emphasized that the above-described embodiments, particularly any "preferred" or exemplary embodiments, are merely possible examples of implementations, merely set forth for a clear understanding of the principles of the present subject matter. Many variations and modifications may be made to the above-described embodiments of the present subject matter without departing substantially from the spirit and principles of the present subject matter. All such modifications and variations are intended to be included herein within the scope of this present subject matter.

Embodiments of the subject matter and the functional operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

Embodiments of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

The present subject matter may thus provide a method for estimating the GPS-system-time relationship using LMUs that may be used by a remote PDE, such as a SMLC/SAS to determine an A-GPS location of the mobile using one less satellite measurement compared to classic A-GPS. This may be useful in cases A-GPS location is desired when the satellite visibility is poor.

As shown by the various configurations and embodiments illustrated in FIGS. 1-7, various embodiments for enhancing A-GPS location accuracy and yield with LMUs and network timing measurements have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of determining the location of a mobile device comprising the steps of:
  (a) requesting by a node one or more location measurement units (LMUs) to provide timing relationship information from a respective cell site in a communications network;
  (b) tasking the one or more LMUs to measure uplink times of arrival of signals received by the one or more LMUs from a target mobile device;
  (c) determining a range from the target mobile device to a serving cell as a function of the measured uplink times of arrival;
  (d) determining a Global Positioning System (GPS) time estimate as a function of the requested LMU timing relationship information;
  (e) populating GPS timing fields and corresponding system timing information in a fine-time assistance message as a function of the determined GPS time estimate;
  (f) transmitting the fine-time assistance message to the target mobile device;
  (g) determining satellite information using GPS timing information reported by the target mobile device in response to the transmitted fine-time assistance message; and
  (h) determining a location of the mobile device as a function of the determined satellite information.

2. The method of claim 1 wherein the step of determining a GPS time estimate further comprises determining a GPS time estimate as a function of the relationship:

$$t_{System_{MS}} = t_{System_{LMU}} + \tau_p$$

where $t_{System_{LMU}}$ represents system time expressed in terms of GPS time and $\tau_p$ represents propagation time from the mobile device to a serving cell.

3. The method of claim 1 wherein the node is selected from the group consisting of a serving mobile location center (SMLC), a standalone SMLC (SAS), and a radio network controller (RNC).

4. The method of claim 1 wherein the timing relationship information is selected from the group consisting of Global System for Mobile Communications-Global Positioning System Broadcast Channel (GSM-GPS BCCH) information and system frame network (SFN) information.

5. The method of claim 1 further comprising the steps of:
(i) receiving the fine-time assistance message by the target mobile device;
(ii) receiving signals from one or more satellites as a function of information in the fine-time assistance message; and
(iii) transmitting a response message to the node with satellite measurements and GPS timing information.

6. The method of claim 1 wherein the communications network is selected from the group consisting of a Universal Mobile Telecommunications System (UMTS) network, a Global System for Mobile Communication (GSM) network, a Time Division Multiple Access (TDMA) network, Code Division Multiple Access (CDMA) network, a Worldwide Interoperability for Microwave Access (WiMax) network, a WiFi network, CDMA2000 network, and a network utilizing Evolution-Data Optimized (EVDO), Long Term Evolution (LTE), or 1 times Radio Transmission Technology (1xRTT) standards.

7. A method of determining the location of a mobile device comprising the steps of:
(a) requesting by a node one or more location measurement units (LMUs) to provide timing relationship information from a respective cell site in a communications network;
(b) tasking the one or more LMUs to measure uplink times of arrival of signals received by the one or more LMUs from a target mobile device;
(c) determining an initial position estimate of the target mobile device using the measured uplink times of arrival measurements;
(d) determining a range from the initial position estimate of the target mobile device to a cell serving the target mobile device;
(e) determining a Global Positioning System (GPS) time estimate as a function of the requested LMU timing relationship information;
(f) populating GPS timing fields and corresponding system timing information in a fine-time assistance message as a function of the GPS time estimate;
(g) transmitting the fine-time assistance message to the target mobile device;
(h) determining satellite information using GPS timing information reported by the target mobile device in response to the transmitted fine-time assistance message; and
(i) determining a location of the target mobile device as a function of the determined satellite information.

8. The method of claim 7 wherein the node is selected from the group consisting of a serving mobile location center (SMLC), a standalone SMLC (SAS), and a radio network controller (RNC).

9. The method of claim 7 wherein the timing relationship information is selected from the group consisting of Global System for Mobile Communications-Global Positioning System Broadcast Channel (GSM-GPS BCCH) information and system frame network (SFN) information.

10. The method of claim 7 wherein ones of the LMUs are collocated with cell sites.

11. The method of claim 7 wherein the step of determining a range further comprises determining a range as a function of the relationship:

$$\tau_p = \frac{1}{2}(TA_{type\_2}).$$

12. The method of claim 7 wherein the step of determining a range further comprises determining a range as a function of the relationship:

$$\tau_p = \frac{1}{2}(TA_{type\_1}).$$

13. The method of claim 7 wherein the step of determining a range further comprises determining a range as a function of the relationship:

$$\tau_p = \frac{1}{2} RTT_{UMTS}.$$

14. The method of claim 7 wherein the step of determining a GPS time estimate further comprises determining a GPS time estimate as a function of the relationship:

$$t_{System_{MS}} = t_{System_{LMU}} + \tau_p$$

where $t_{System_{LMU}}$ represents system time expressed in terms of GPS time and $\tau_p$ represents propagation time from the mobile device to a serving cell.

15. The method of claim 7 wherein the step of determining a range from the initial position estimate of the target mobile device to a cell serving the target mobile device is performed using the relationship $$\tau_p = \text{distance}(\text{Serving cell}(x,y), \text{initial phone location}(\widehat{x,y}).$$

16. The method of claim 7 wherein the step of determining an initial position estimate of the target mobile device further comprises using observed time difference of arrival of signals received by the target mobile device to determine the initial position estimate.

17. The method of claim 16 wherein the step of determining a range from the initial position estimate of the target mobile device to a cell serving the target mobile device is performed using the relationship $$\tau_p = \text{distance}(\text{Serving cell}(x,y), \text{initial phone location}(\widehat{x,y})_{OTDOA}).$$

18. The method of claim 7 further comprising the steps of:
(i) receiving the fine-time assistance message by the target mobile device;
(ii) receiving signals from one or more satellites as a function of information in the fine-time assistance message; and
(iii) transmitting a response message to the node with satellite measurements and GPS timing information.

19. The method of claim 7 wherein the communications network is selected from the group consisting of a Universal Mobile Telecommunications System (UMTS) network, a Global System for Mobile Communication (GSM) network, a Time Division Multiple Access (TDMA) network, Code Division Multiple Access (CDMA) network, a Worldwide Interoperability for Microwave Access (WiMax) network, a WiFi network, CDMA2000 network, and a network utilizing Evolution-Data Optimized (EVDO), Long Term Evolution (LTE), or 1 times Radio Transmission Technology (1xRTT) standards.

20. A method of determining the location of a mobile device comprising the steps of:
 (a) receiving at a node timing relationship information from a respective cell site in a communications network;
 (b) measuring uplink times of arrival of signals from a target mobile device;
 (c) determining a range from the target mobile device to a serving cell as a function of the measured uplink times of arrival;
 (d) determining a Global Positioning System (GPS) time estimate as a function of the requested timing relationship information;
 (e) populating GPS timing fields and corresponding system timing information in a fine-time assistance message as a function of the determined GPS time estimate;
 (f) transmitting the fine-time assistance message to the target mobile device;
 (g) determining satellite information using GPS timing information reported by the target mobile device in response to the transmitted fine-time assistance message; and
 (h) determining a location of the mobile device as a function of the determined satellite information.

21. A method of determining the location of a mobile device comprising the steps of:
 (a) receiving at a node timing relationship information from a respective cell site in a communications network;
 (b) measuring uplink times of arrival of signals from a target mobile device;
 (c) determining an initial position estimate of the target mobile device using the measured uplink times of arrival measurements;
 (d) determining a range from the initial position estimate of the target mobile device to a cell serving the target mobile device;
 (e) determining a Global Positioning System (GPS) time estimate as a function of the requested timing relationship information;
 (f) populating GPS timing fields and corresponding system timing information in a fine-time assistance message as a function of the GPS time estimate;
 (g) transmitting the fine-time assistance message to the target mobile device;
 (h) determining satellite information using GPS timing information reported by the target mobile device in response to the transmitted fine-time assistance message; and
 (i) determining a location of the target mobile device as a function of the determined satellite information.

* * * * *